(12) United States Patent
Caillot et al.

(10) Patent No.: US 9,902,374 B2
(45) Date of Patent: Feb. 27, 2018

(54) HEATING CONDUCTIVE WIRE-LIKE ELEMENT FOR THE MANUFACTURE OF A WASHER FLUID HEATING AND CARRYING PIPE WITH CONTROLLED LINEAR HEATING POWER, AND ASSOCIATED HEATING PIPE AND WIPER DEVICE

(71) Applicant: Valeo Systèmes d'Essuyage, Le Mesnil Saint Denis (FR)

(72) Inventors: Gérald Caillot, Cernay la Ville (FR); Jean-Michel Jarasson, Le Mesnil Saint Denis (FR); Vincent Izabel, Chilly Mazarin (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 583 days.

(21) Appl. No.: 14/572,943

(22) Filed: Dec. 17, 2014

(65) Prior Publication Data
US 2015/0166019 A1 Jun. 18, 2015

(30) Foreign Application Priority Data
Dec. 17, 2013 (FR) ...................... 13 62755

(51) Int. Cl.
*B60S 1/48* (2006.01)
*H01B 13/24* (2006.01)
(Continued)

(52) U.S. Cl.
CPC .............. *B60S 1/488* (2013.01); *H01B 13/24* (2013.01); *H05B 3/48* (2013.01); *H05B 3/56* (2013.01);
(Continued)

(58) Field of Classification Search
CPC .......... B60S 1/488; B60S 1/487; B60S 1/524; B60S 1/3862; H05B 3/48; H05B 3/56; H05B 3/58; F16L 53/008
(Continued)

(56) References Cited

U.S. PATENT DOCUMENTS 4,816,649 A * 3/1989 Eilentroop ............... H05B 3/56
219/549
2005/0083638 A1 4/2005 Warren et al.
(Continued)

FOREIGN PATENT DOCUMENTS

| EP | 2109344 A2 | 10/2009 |
|---|---|---|
| EP | 2575409 A1 | 4/2013 |
| FR | 2971471 A1 | 8/2012 |

OTHER PUBLICATIONS

FR2971471A1 (machine translation), 2012.*
Preliminary Search Report in corresponding French Application No. 1362755 dated Nov. 6, 2014 (8 pages).

*Primary Examiner* — Andrew A Horton
(74) *Attorney, Agent, or Firm* — Seema M. Mehta

(57) ABSTRACT

A heating conductive wire-like element is disclosed, having a heating conductive strand arranged in a helix around a central fibre, of which the pitch between strands in at least a first zone of the wire-like element is of a first value for producing a first linear heating power, and of which the pitch between strands in at least one second zone of the wire-like element is of a second value smaller than the first value in order to produce a second linear heating power higher than the first linear heating power. A washer fluid heating and carrying pipe including at least one fluid circulation canal situated near a heating conductive wire made from the aforementioned wire-like element is also disclosed. A wiper
(Continued)

device for a glazed surface of a vehicle incorporating at least one such pipe, and a method of manufacturing a pipe is also disclosed.

12 Claims, 4 Drawing Sheets

(51) Int. Cl.
    *H05B 3/56*     (2006.01)
    *H05B 3/48*     (2006.01)
    *H05B 3/58*     (2006.01)

(52) U.S. Cl.
    CPC .......... *H05B 3/58* (2013.01); *H05B 2203/021* (2013.01); *H05B 2203/037* (2013.01)

(58) Field of Classification Search
    USPC ........................................ 15/250.04–250.09
    See application file for complete search history.

(56) References Cited

U.S. PATENT DOCUMENTS

| | | |
|---|---|---|
| 2012/0008927 A1 | 1/2012 | Borgmeier et al. |
| 2013/0157489 A1* | 6/2013 | Jarasson ................ B60S 1/488 439/191 |
| 2013/0193129 A1 | 8/2013 | Jones |

\* cited by examiner

HEATING CONDUCTIVE WIRE-LIKE ELEMENT FOR THE MANUFACTURE OF A WASHER FLUID HEATING AND CARRYING PIPE WITH CONTROLLED LINEAR HEATING POWER, AND ASSOCIATED HEATING PIPE AND WIPER DEVICE

The invention relates mainly to a heating conductive wire-like element.

The invention also relates to a washer fluid heating and carrying pipe incorporating a heating conductive wire produced from the said heating conductive wire-like element.

The invention further relates to a wiper device for a glazed surface of a motor vehicle.

The invention finally relates to a method of manufacturing a pipe for heating and carrying the washer fluid.

The distribution of washer fluid directly to the nozzles formed in the wiper blades of a motor vehicle allows the washer fluid sprayed onto the window to be wiped away quickly, thereby reducing the interval of time for which the driver has reduced vision because of the washer fluid present on the windscreen.

Furthermore, heating the washer fluid when the latter is at a temperature below a threshold temperature, for example 5° C., allows the wiper system to operate optimally even during the low temperatures of winter conditions.

Figure 1:
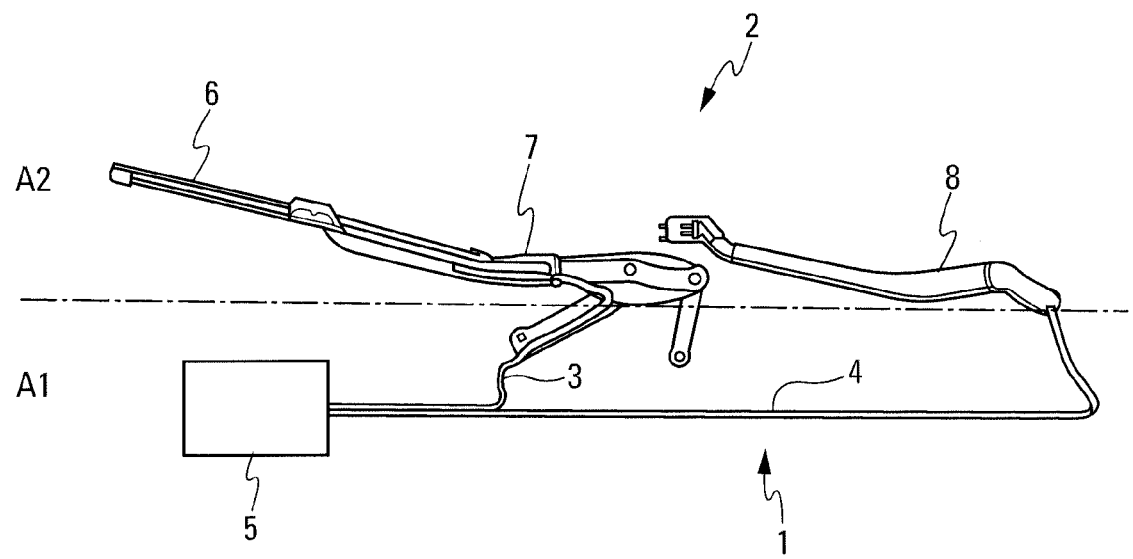

With reference to FIG. 1, a prior-art washer fluid heating and distribution system 1 incorporated into a motor vehicle window wiping system 2 comprises a first 3 and a second 4 pipes for heating and carrying the washer fluid, which pipes each extend from a washer fluid reservoir 5 and, via a pump and nonreturn valves none of which have been depicted, carry the washer fluid to the nozzles of two spray lines formed on each of the wiper blades 6.

To do that, each of the first 3 and second 4 pipes is incorporated into the relevant wiper blade 7,8.

Figure 2:
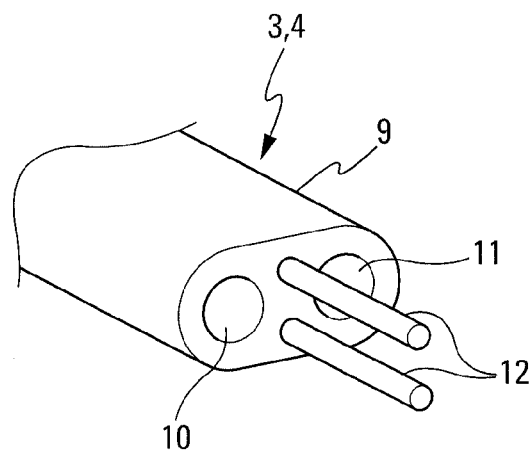

With reference to FIG. 2, each first and second washer fluid heating and carrying pipe 3, 4 is made of an extruded sleeve 9 comprising two washer fluid circulation canals 10,11 which carry the washer fluid to the two spray lines formed on each of the wiper blades 6. The presence of these two spray lines allows the washer fluid to be distributed on each side of the wiper blade 6 according to the direction in which this blade is travelling thereby reducing still further the interval of time for which the driver has reduced vision. The context of the invention is not restricted to the use of two washer fluid circulation canals per wiper blade because just one washer fluid circulation canal may equally be provided if each wiper blade has just one spray line.

In order to heat the washer fluid, each of the first 3 and second 4 pipes further comprises a heating conductive wire 12 which is embedded within the mass of the relevant pipe 3,4 and is doubled in order to provide it with electrical connection, usually situated at the nonreturn valves.

The conductive wire 12 thus allows the washer fluid carried in the relevant pipe 3,4 to be heated when environmental temperatures are low.

However, with reference to FIG. 1, the environmental conditions of the first 3 and second 4 pipes differ according to whether this pipe 3,4 is situated in a zone A1 situated under the bonnet of the vehicle near the engine, or in a zone A2 situated on the wiper blades 7,8 outside the bonnet of the vehicle.

So it is then found that near the engine under the bonnet, the environment is hotter and overheating of the pipes 3,4 may be seen.

Conversely, in the zone A2 subjected to the cold wind, it is necessary to provide a minimum level of heating power in order to deice the pipes 3,4.

It is thus necessary to find a compromise in terms of linear heating power of the heating conductive wire in order to prevent overheating in the zone A1 under the bonnet while at the same time ensuring the de-icing of the pipe in the zone A2 outside of the bonnet. However, this compromise has to be reached at the expense of the effectiveness of heating in the part outside of the bonnet and/or at the expense of the protection of the pipes in the part situated under the bonnet near the engine.

In this context, the present invention aims for a system that allows the aforementioned disadvantages to be alleviated.

To this end, the invention relates first of all to a heating conductive wire-like element, which is essentially characterized in that it comprises a heating conductive strand arranged in a helix around a central fibre, of which the pitch between strands in at least a first sector of the said wire-like element is of a first value for producing a first linear heating power, and of which the pitch between strands in at least one second sector of the said wire-like element is of a second value smaller than the first value in order to produce a second linear heating power higher than the first linear heating power.

The heating conductive wire-like element of the invention thus makes it possible to generate different linear powers in predefined zones.

The heating conductive wire-like element of the invention may also have the following optional features considered in isolation or in any technically feasible combination:

It comprises an alternation of first and second sectors.

It comprises a third sector arranged on the said wire-like element such that a first and a second sector which are contiguous extend between two adjacent third sectors.

The invention also relates to a pipe for heating and carrying a washer fluid for a wiper blade, which is essentially characterized in that it comprises at least one canal for the circulation of the washer fluid which extends from a washer fluid reservoir situated under the bonnet of the vehicle as far as the wiper blade and which is arranged near at least one heating conducting wire made from the heating conductive wire-like element defined hereinabove and comprising a first and a second sector for heating the washer fluid circulating in the circulation canal according to the first linear power for the zone of the pipe situated under the bonnet of the vehicle, and according to the second linear power for the zone of the pipe situated outside of the bonnet of the vehicle.

The washer fluid heating and carrying pipe for a wiper blade may also comprise the following optional features considered in isolation or in any technically feasible combination:

The heating conductive wire is duplicated by being made of two portions of the wire-like element which are parallel and each of which comprises a first and a second sector which are adjacent, the two portions of the wire-like element being connected together and connected to a power supply to form a circuit for current.

The ratio between the first value of the pitch between strands of the heating conductive wire for the zone of the pipe that is situated under the bonnet of the vehicle, and the second value of the pitch between strands of the heating conductive wire for the zone of the pipe situated outside the bonnet of the vehicle is approximately of the order of 2.

The first value of the pitch between strands of the heating conductive wire for the zone of the pipe situated under the bonnet of the vehicle is between 1 and 5 millimeters.

An insulating sheath covers the assembly formed by the helically wound heating conductive strand and the central fibre of the heating conductive wire.

The heating conductive wire is arranged in the washer fluid circulation canal.

Two washer fluid circulation canals for supplying a wiper blade that has two spray lines, and a heating conductive wire is arranged in each circulation canal.

The circulation canal is arranged inside an extruded sleeve and the heating conductive wire is embedded within the mass of the sleeve.

The heating conductive wire is made from the heating conductive wire-like element comprising the third sector.

Two circulation canals are arranged in the sleeve for supplying a wiper blade having two spray lines.

The invention further relates to a wiper device for a glazed surface of a motor vehicle comprising at least one wiper blade equipped with at least one first spray line, and which is essentially characterized in that it comprises a washer fluid heating and carrying pipe as defined hereinabove the washer fluid circulation canal of which is connected, on the one hand, to the spray line that it supplies and, on the other hand, is intended to be connected to a pump.

Advantageously, the wiper device comprises a washer fluid heating and carrying pipe equipped with two washer fluid circulation canals, of which the first washer fluid circulation canal is connected, on the one hand, to a first spray line that it supplies and, on the other hand, is intended to be connected to a pump, and the second washer fluid circulation canal is connected, on the one hand, to a second spray line that it supplies and, on the other hand, is intended to be connected to a pump.

Finally, the invention relates to a method of manufacturing a washer fluid heating and carrying pipe incorporating a heating conductive wire produced from a heating conductive wire-like element which comprises a third sector, and which is essentially characterized in that the heating conductive wire-like element is coextruded in the sleeve comprising the washer fluid circulation canal, then in that the third sector of the heating conductive wire-like element is detected, and in that the sleeve is cut at this detected third sector.

The method of the invention may also comprise the following optional features considered in isolation or in any feasible technical combinations:

The third sector of the heating conductive wire-like element is detected by magnetism after the extrusion operation.

During the extrusion operation a mark is produced on the sleeve at the third sector of the heating conductive wire-like element, and the detection of the said third sector is performed by identifying the said mark.

Figure 3:
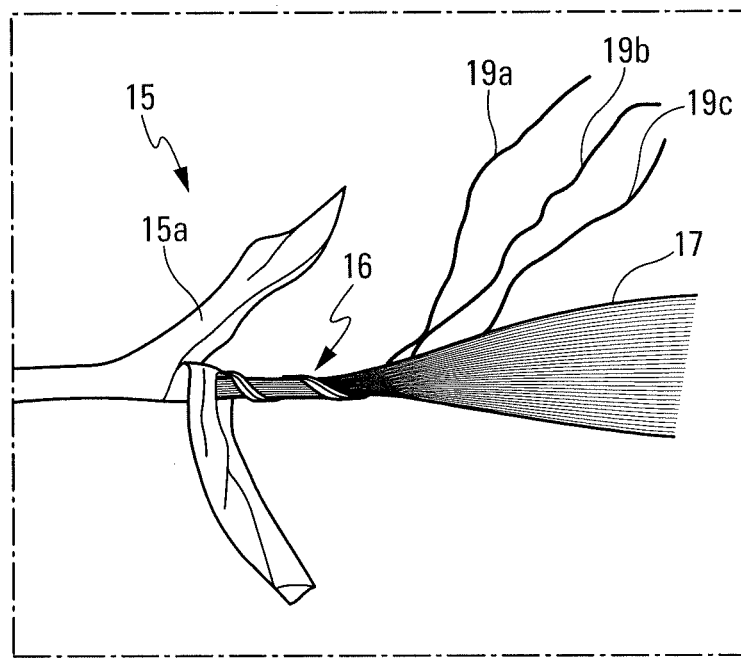
Figure 4:
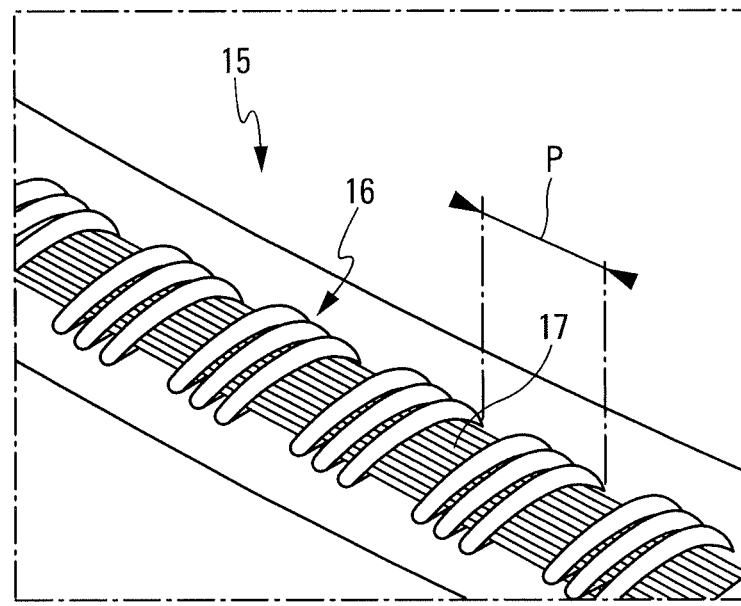
Figure 5:
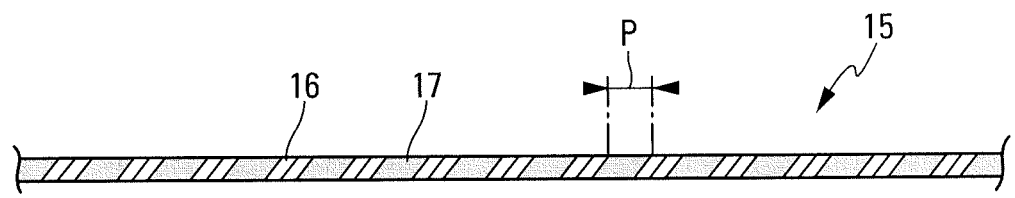
Figure 6:
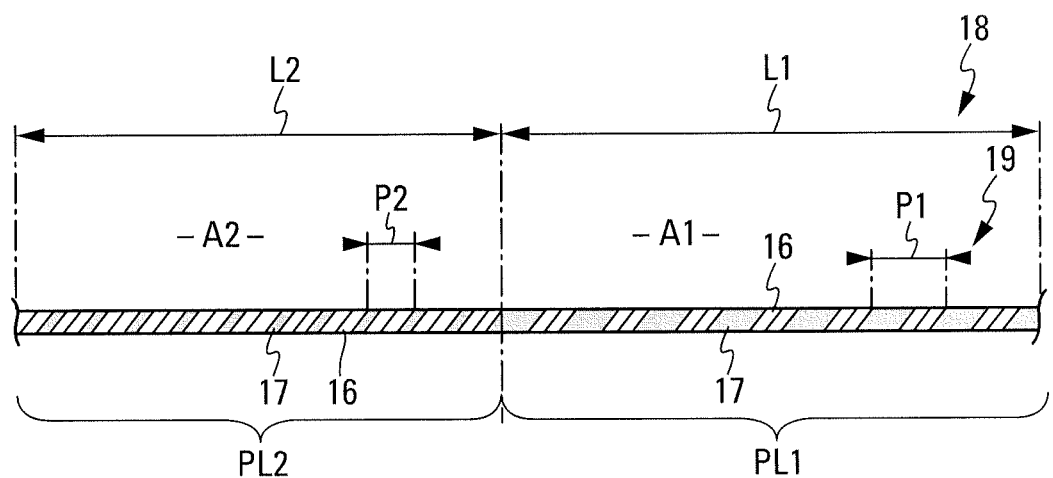
Figure 7:
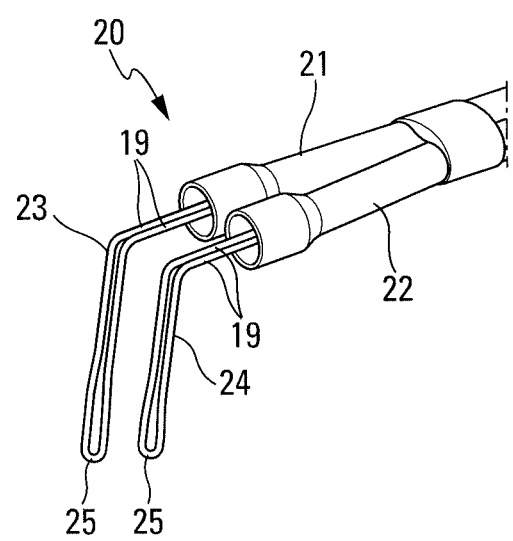
Figure 8:
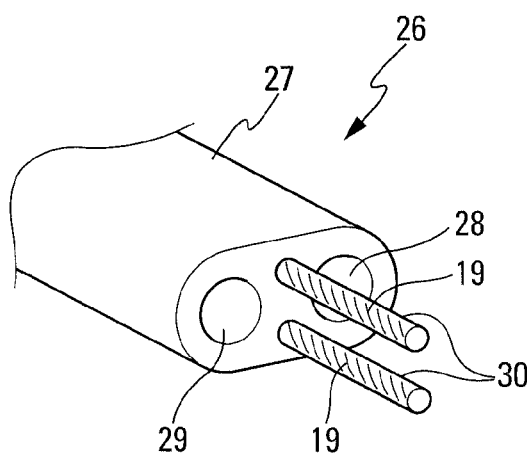
Figure 9:
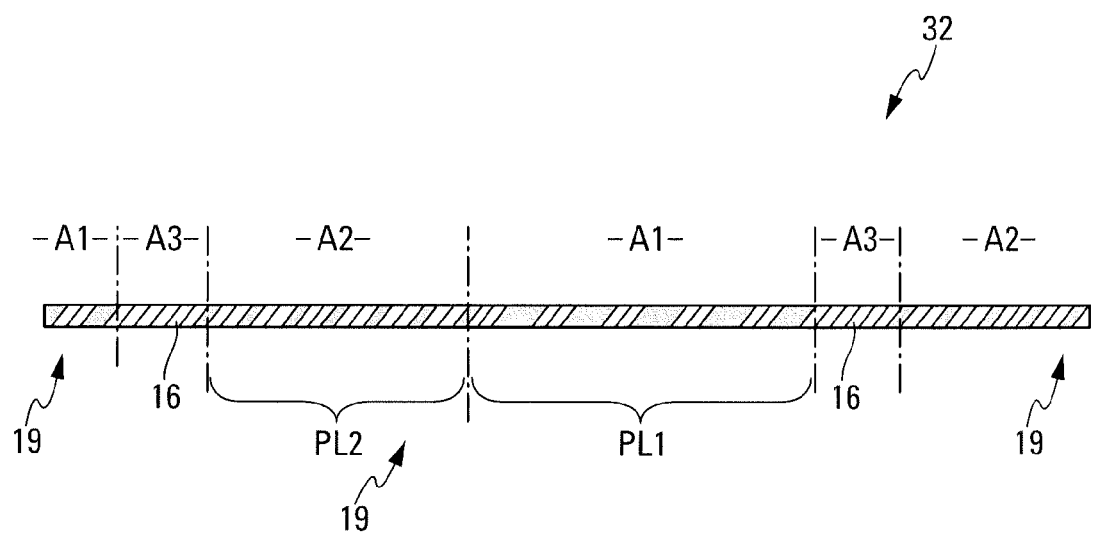

Other features and advantages of the invention will become clearly apparent from the description thereof given hereinbelow by way of nonlimiting indication with reference to the attached drawings among which:

FIG. 1, already described, is a schematic view of a washer fluid heating and distribution system 1 of the prior art, FIG. 2, already described, is a perspective schematic view of a washer fluid heating and carrying pipe of the prior art, FIG. 3 is a schematic side view of a helix-wound heating conductive wire showing the various components of this wire, FIG. 4 is a schematic perspective and elevation view of an assembled helix-wound heating conductive wire, FIG. 5 is a schematic side view of a helix-wound conductive wire depicted without the insulating sheath, showing the evenness of pitch between strands, FIG. 6 is a schematic side view of the heating conductive wire-like element of the invention depicted without the insulating sheath according to a first alternative form of embodiment, FIG. 7 is a schematic perspective view of a washer fluid heating and carrying pipe for a wiper blade of the invention according to a first configuration comprising two circulation canals each incorporating a heating conductive wire produced from the wire-like element of FIG. 6, FIG. 8 is a schematic perspective view of a washer fluid heating and carrying pipe for a wiper blade of the invention according to a second configuration comprising two circulation canals and two heating conductive wires produced from the wire-like element of FIG. 6 or FIG. 9, and FIG. 9 is a schematic side view of the heating conductive wire-like element of the invention depicted without the insulating sheath according to a second alternative form of embodiment which is particularly suited to producing the heating pipe of FIG. 8.

With reference to FIGS. 3 to 5, a heating conductive wire 15 is made up of a conductive strand 16 wound in a helix around a central fibre 17, for example made of fibreglass, which provides the heating wire 15 with robustness. The assembly formed by the strand 16 and the central fibre 17 is surrounded by an insulating sheath 15a for example made of Teflon. In this example, the heating conductive strand 16 is made up of three metal wires 9a, 19b, 19c. The number of metal wires and the nature thereof are chosen according to the target linear heating powers.

With reference to FIGS. 4 and 5, the helical winding of the strand 16 around the central fibre 17 is even and is thus defined by a constant pitch P between strands.

According to the invention, the pitch P between strands 16 is varied in order to alter the linear heating power on the resulting heating conductive wire. In the zone A1 (FIG. 1) where the washer fluid heating and carrying pipe is under the bonnet near the engine of the vehicle, the pitch between the strands is more widely spaced than in the zone A2 where the pipe is subjected to the cold wind.

To achieve this, and with reference to FIG. 6 which illustrates a first alternative form of embodiment, use is made of a heating conductive wire-like element 18 comprising a helical strand 16 wound around the central fibre 17, the assembly formed by the helical strand 16 and the central fibre 17 being surrounded by the insulating sheath 15 not visible in this figure.

In the first zone A1 intended to be situated under the bonnet of the vehicle, the pitch between strands 16 has a first value P1 and in the second zone A2 intended to be outside of the bonnet, the pitch between strands has a second value P2 smaller than the first pitch value P1. Thus, in the zone A2, the linear heating power PL2 is higher than the linear heating power PL1 of the zone A1.

The heating conductive wire-like element 18 comprises an alternating succession of sectors having a linear heating power PL1 and a linear heating power PL2. The respective lengths L1, L2 of these sectors are determined according to the layout of the washer fluid heating and carrying pipes on the vehicle. A portion 19 of the wire-like element 18, is thus defined which is made up of a sector having a linear heating power PL1 and of a sector having a linear heating power PL2, these sectors being adjacent.

The heating conductive wire-like element 18 is manufactured using known methods of manufacturing helix-wound heating conductive wire.

With reference to FIG. 7 and according to a first configuration, a washer fluid heating and carrying pipe for a wiper blade 20 comprises two washer fluid circulation canals 21,22 feeding the two spray lines of a wiper blade which has not been depicted.

One heating conductive wire 23,24 is arranged in each circulation canal 21, 22. Each heating conductive wire 23,24 is obtained by cutting two portions 19 of the wire-like element 18 of FIG. 6. The ends 25 of the two portions 19 are joined together and the opposite ends, not visible, are connected to a power supply to form a circuit for current.

A heating conductive wire 23,24 obtained from just one wire having two portions 19 of the wire-like element 18 of FIG. 6 is also conceivable. This wire has, in succession, a first sector having a linear heating power PL1, a second sector having a linear heating power PL2, a third sector having a linear heating power PL2 and a fourth sector having a linear heating power PL1. A bend is made between the two sectors having a linear heating power PL2. Thus, when installed in the circulation canal 21,22, the sectors having the same linear power are superposed with one another.

This then yields a heating pipe 20 able to deliver a first linear heating power PL1 for a zone A1 situated under the bonnet of the vehicle and a second linear heating power PL2 higher than the first linear power PL1 for a zone A2 situated outside the bonnet.

With reference to FIG. 8 and according to a second configuration, the washer fluid heating and carrying pipe 26 comprises an extruded sleeve 27 of two washer fluid circulation canals 28,29 which carry the washer fluid to two spray lines formed on each of the wiper blades.

A heating conductive wire 30 is embedded in the mass by coextrusion near the circulation canals 28,29. As with the first configuration in FIG. 7, the heating conductive wire 30 is obtained by cutting two portions 19 of the heating conductive wire-like element 18 of FIG. 6, these two portions 19 being intended to be joined together at their first ends and connected to a power supply at their opposite ends in order to form a circuit for current.

In this second configuration, there may be difficulties regarding the precision with which the portion 19 is cut.

This is because the washer fluid heating and carrying pipe 26 is produced by cutting a very long sleeve in which the heating conductive wire-like element 18 of FIG. 6 is embedded. When cutting the sleeve to produce the pipe 26 the wire-like element 18 is not visible which means it may be difficult to know precisely the position of the junction between the zones A1 and A2 of the wire-like element for cutting the portion 19 of the wire-like element 18 and thus forming the conductive wire 30.

With reference to FIG. 9 and in order to alleviate the abovementioned disadvantage, the conductive wire-like element 32 in a second alternative form comprises an alternation of sectors having a linear heating power PL1 and a linear heating power PL2 which are identical to those of the wire-like element 18 of FIG. 6, but also comprises sectors A3 arranged between each portion 19 made of two sectors having a linear heating power PL1 and a linear heating power PL2.

In the zone A3, the helical winding of the conductive strand 16 is contiguous, which will allow this zone A3 to be detected so that the sleeve 27 can be cut in such a way that the conductive wire 30 does indeed comprise a zone A1 and a zone A2 both of suitable length.

This detection can be performed in two ways.

First, during the extrusion operation, a mark is made on the sleeve at the third zone A3 which is spotted by an operator or by an automatic visual detection method. The sleeve 27 is then cut according to this mark.

Second, no marking is performed during the extrusion operation and the third zone A3 of the wire-like element 32, which element is embedded in the sleeve 27, is detected by a suitable detection means able to identify the contiguous winding of this zone A3, for example using magnetism. The sleeve 27 is thus cut according to the detection of the zone A3.

In the wire-like elements 18, 32 of the first and second alternative forms of embodiment, the ratio between the first value P1 of pitch of the zone A1 intended to be situated under the bonnet of the vehicle, and the second value P2 of pitch of the zone A2 intended to be situated outside of the bonnet of the vehicle is approximately 2, with a first pitch value P1 of between 1 and 5 millimeters. Quite obviously, this ratio will be adapted according to the type of vehicle, notably taking into consideration the configuration of the elements situated under the bonnet and likely to convey heat to the pipe.

Moreover, while the washing fluid heating and carrying pipes of the first and second configurations of FIGS. 7 and 8 comprise two circulation canals, the invention also applies to pipes comprising just one washer fluid circulation canal for feeding a single spray line on each wiper blade.

Finally, the invention also relates to a wiper device for a glazed surface of a motor vehicle comprising at least one washer fluid heating and carrying pipe 20,26 described and the washer fluid circulation canal 21,22; 28,29 of which is connected on the one hand to the spray line that it supplies and, on the other hand, is intended to be connected to a pump.

In the case of two spray lines per blade, the wiper device of the invention comprises at least one washer fluid heating and transporting pipe the first washer fluid circulation canal 21; 28 of which is connected on the one hand to the first spray line that it supplies and, on the other hand, is intended to be connected to a pump, and the second washer fluid circulation canal 22; 29 of which is connected, on the one hand, to the second spray line that it supplies and, on the other hand, is intended to be connected to a pump.

The invention claimed is:

1. A pipe for heating and carrying a washer fluid for a wiper blade, comprising:
at least one canal for the circulation of the washer fluid which extends from a washer fluid reservoir situated under a bonnet of a vehicle as far as the wiper blade and which is arranged near at least one heating conducting wire made from a heating conductive wire-like element comprising:
a heating conductive strand arranged in a helix around a central fibre, of which a pitch between strands in at least a first sector of the wire-like element is of a first value for producing a first linear heating power, and of which a pitch between strands in at least one second sector of the wire-like element is of a second value smaller than the first value in order to produce a second linear heating power higher than the first linear heating power; and
the first and the second sector for heating the washer fluid circulating in the circulation canal according to the first linear power for the zone of the pipe situated under the bonnet of the vehicle, and according to the second linear power for the zone of the pipe situated outside of the bonnet of the vehicle, wherein the heating conductive wire is arranged in the washer fluid circulation canal.

2. The pipe according to claim 1, wherein the heating conductive wire is duplicated by being made of two portions of the wire-like element which are parallel and each of which comprises a first and a second sector which are adjacent, the two portions of the wire-like element being connected together and connected to a power supply to form a circuit for current.

3. The pipe according to claim 1, wherein the ratio between the first value of the pitch between strands of the heating conductive wire for the zone of the pipe that is situated under the bonnet of the vehicle, and the second value of the pitch between strands of the heating conductive wire for the zone of the pipe situated outside the bonnet of the vehicle is approximately of the order of 2.

4. The pipe according to claim 3, wherein the first value of the pitch between strands of the heating conductive wire for the zone of the pipe situated under the bonnet of the vehicle is between 1 and 5 millimeters.

5. The pipe according to claim 1, further comprising two washer fluid circulation canals for supplying the wiper blade that has two spray lines, and wherein a heating conductive wire is arranged in each circulation canal.

6. A wiper device for a glazed surface of a motor vehicle, comprising:
  at least one wiper blade equipped with a first and with a second spray line; and
  a washer fluid heating and carrying pipe according to claim 5, of which a first of the two washer fluid circulation canals is connected, on the one hand, to the first spray line that it supplies and, on the other hand, to a pump,
  wherein a second of the two washer fluid circulation canals is connected, on the one hand, to the second spray line that it supplies and, on the other hand, to a pump.

7. The pipe according to claim 1, wherein the circulation canal is arranged inside an extruded sleeve and the heating conductive wire is embedded within the mass of the sleeve.

8. The pipe according to claim 7, wherein two circulation canals are arranged in the sleeve for supplying the wiper blade having two spray lines.

9. A wiper device for a glazed surface of a motor vehicle comprising:
  at least one wiper blade equipped with at least one first spray line; and
  a washer fluid heating and carrying pipe according to claim 4, the washer fluid circulation canal of which is connected, on the one hand, to the spray line that it supplies and, on the other hand, is intended to be connected to a pump.

10. A pipe for heating and carrying a washer fluid for a wiper blade, comprising:
  at least one canal for the circulation of the washer fluid which extends from a washer fluid reservoir situated under a bonnet of a vehicle as far as the wiper blade and which is arranged near at least one heating conducting wire made from a heating conductive wire-like element comprising:
    a heating conductive strand arranged in a helix around a central fibre, of which the pitch between strands in at least a first sector of the wire-like element is of a first value for producing a first linear heating power, and of which the pitch between strands in at least one second sector of the wire-like element is of a second value smaller than the first value in order to produce a second linear heating power higher than the first linear heating power; and
  the first and the second sector for heating the washer fluid circulating in the circulation canal according to the first linear power for the zone of the pipe situated under the bonnet of the vehicle, and according to the second linear power for the zone of the pipe situated outside of the bonnet of the vehicle,
  wherein an insulating sheath covers the assembly formed by the helically wound heating conductive strand and the central fibre of the heating conductive wire.

11. The heating conductive wire-like element according to claim 10, further comprising an alternation of first and second sectors.

12. The heating conductive wire-like element according to claim 11, further comprising a third sector arranged on the wire-like element such that a first and a second sector which are contiguous extend between two adjacent third sectors.

* * * * *